United States Patent [19]

Klein

[11] Patent Number: 4,659,153

[45] Date of Patent: Apr. 21, 1987

[54] SLIP-CONTROLLED BRAKE SYSTEM

[75] Inventor: Hans-Christof Klein, Hattersheim, Fed. Rep. of Germany

[73] Assignee: Alfred Teves GmbH, Frankfurt am Main, Fed. Rep. of Germany

[21] Appl. No.: 776,418

[22] Filed: Sep. 16, 1985

[51] Int. Cl.$^4$ .............................................. B60T 8/02
[52] U.S. Cl. ................................. 303/114; 303/119
[58] Field of Search ............... 303/114, 100, 113, 119, 303/50–56, 110, 97, 111, 116; 60/545, 581, 582, 554, 547.1, 551–553, 591; 74/471, 469; 188/345, 355–360, 181

[56] References Cited

U.S. PATENT DOCUMENTS

| | | | |
|---|---|---|---|
| 3,371,485 | 3/1968 | Reichard | 60/545 |
| 3,578,820 | 5/1971 | Riordan | 303/114 |
| 3,608,982 | 9/1971 | Inada et al. | 303/114 |
| 4,523,792 | 6/1985 | Belart et al. | 188/345 X |

FOREIGN PATENT DOCUMENTS 2311580  9/1973  Fed. Rep. of Germany ...... 188/357
1511254  5/1978  United Kingdom .

Primary Examiner—Douglas C. Butler
Attorney, Agent, or Firm—James B. Raden; William J. Michals

[57] ABSTRACT

A slip-controlled brake system, wherein the brake pedal effort is transmitted power-assisted to a master cylinder (10) to the wheel cylinders through several hydraulic fluid paths which allow shut off independently of one another. The behavior of rotation of the wheels and the vehicle speed are measured by sensors (S1 to S4), with the signals logically linked and control signals generated from them for electromagnetically actuatable directional control valves (15, 16, 17). In the event of a control action, the power assisted pedal effort (F) directed on the master cylinder (10) is temporarily compensated by an external power action in an opposite direction whereby the pressure increase in the master cylinder (10) is slowed down or decreased.

10 Claims, 7 Drawing Figures

SLIP-CONTROLLED BRAKE SYSTEM

BACKGROUND OF THE INVENTION

The invention relates to a slip-controlled brake system with a power-assisted, brake pedal-actuated master cylinder, with sensors for the determination of the behavior of rotation of the wheels and of the vehicle speed or of analogous measurands. Valves are provided in the hydraulic fluid supply lines going from the master cylinder to the wheel cylinders and an electronic switching arrangement is provided for the logical linkage and processing of the sensor signals and for the generation of valve control signals. The power-assisted pedal force directed on the master cylinder is temporarily compensatable in part or in full by an external power acting in opposite direction. The wheel cylinders are connected, during or within the phase of reduced pressure in the master cylinder, to the master cylinder through the hydraulic fluid supply lines or are cut off due to an actuation of the valves depending on the instantaneous behavior of rotation of the relevant wheel or of a group of wheels. A servo unit in accordance with the principle of a vacuum brake power booster is provided for the generation of the auxiliary power and of the opposedly directed external power. The servo unit comprises a vacuum cylinder with a power piston which, in accordance with the pressure differential in the power chambers on either side of the power piston, transmits a pressure to a push rod. The push rod acts upon the master-cylinder piston. The pressure differential in the two power chambers is controllable with valves depending on the brake pedal effort.

A slip-controlled brake system of this type is described on German patent application P No. 33 17 629.9 which corresponds to copending U.S. application Ser. No. 609,573 filed 5-11-84 in which the piston rod coupled to the brake pedal acts, either directly on through a column of hydraulic fluid, on the push rod sliding the master cylinder piston. The push rod is coupled to the piston of the vacuum cylinder. This arrangement has the disadvantage that the master cylinder piston may move after the closure of the solenoid valves inserted in the brake lines thereby reaspirating hydraulic fluid from the supply tank of the master cylinder through the primary cup of the master cylinder piston. It is a further disadvantage of the prior art brake system that a reduction of the pressure in the brake lines takes place exclusively when the piston rod carried out a stroke in contrast to the direction of pedal operation. The consequence is that the driver cannot develop any feeling for the degree of brake power applied.

The object of the present invention is to create a slip-controlled brake system in which the servo unit provided for the generation of the auxiliary power and of the opposedly directed external power and operating according to the principle of a vacuum brake power booster is arranged such that it gives the driver a precise feeling for the brake power applied at each moment. In this context, the degree of the pedal effort applied by the driver should be independent of the time sequence of the control cycle, and the reduction of the pressure in the brake lines should take place with particular quickness in the presence of a comparatively moderate vacuum with the sections of the tubing and hoses necessary for the brake system being of a comparatively small size. Beyond this, the brake system should offer particular reliability in operation, and it should provide a simple set-up and low manufacturing cost.

SUMMARY OF THE INVENTION

According to the invention, this object is achieved wherein a play is provided between the piston rod coupled to the brake pedal, on one side, and the push rod of the master cylinder, on the other side, and wherein the piston rod shifts the push rod upon overcoming the play. A spring and/or a piston which is subjected to the atmospheric pressure acts, in reaction to the foot effort, on the valve member of the servo unit controlling the flow of atmospheric air and a valve being arranged in the power piston of the servo unit. The valve effects the pressure balance between the power chambers on either side of the power piston in order to control the power acting on the push rod.

In this configuration, the housing of the atmosphere control valve is preferably subjected to the force exerted by an auxiliary piston which is slidably accommodated within the housing of the servo unit and is subjected to the atmospheric pressure and/or to the vacuum. A partition wall is positioned between the auxiliary piston or compensating piston, on one side, and the power piston, on the other side. The partition wall separates the power chamber for the power piston from the power chamber for the auxiliary piston.

The components of the brake system in accordance with the present invention include a servo unit which is combined with a master cylinder and which differs from a customary vacuum brake power booster by relatively minor modifications. The improvement provides for interchangeability of the power chambers on either side of the power piston, respectively of an auxiliary piston, and opposedly directed external power by means of which the power-assisted pedal action is temporarily compensated by short-circuiting the power chambers within the servo unit. By analogy with conventional vacuum booster, the gradient and the entity of the opposedly directed external power are finely and precisely dosed by this principle. This is done in a relatively simple manner, namely by interchanging or short-circuiting of the vacuum and atmosphere connections or by varying the times of commutation.

BRIEF DESCRIPTION OF THE DRAWING

The invention will be described in more detail in conjunction with the accompanying drawing in which:

FIG. 2 illustrates a diagram of a brake system in which the atmosphere control valve is positioned at the servo unit coaxially with the booster piston;

FIG. 3 shows a diagram of a brake system similar to that according to FIG. 2, with the auxiliary piston being designed as a two-part device;

FIGS. 4 and 5 show servo units whose pistons and partition walls are equipped with various valves and restrictors;

FIG. 6 is a partial section view through the partition wall of a servo unit, with a diaphragm-controlled restrictor being arranged in the partition wall; and, FIG. 7 is the longitudinal partial section view through an atmosphere control valve with poppet valve, valve piston and reaction disc for a servo unit as per FIG. 3.

DETAILED DESCRIPTION

Figure 1:
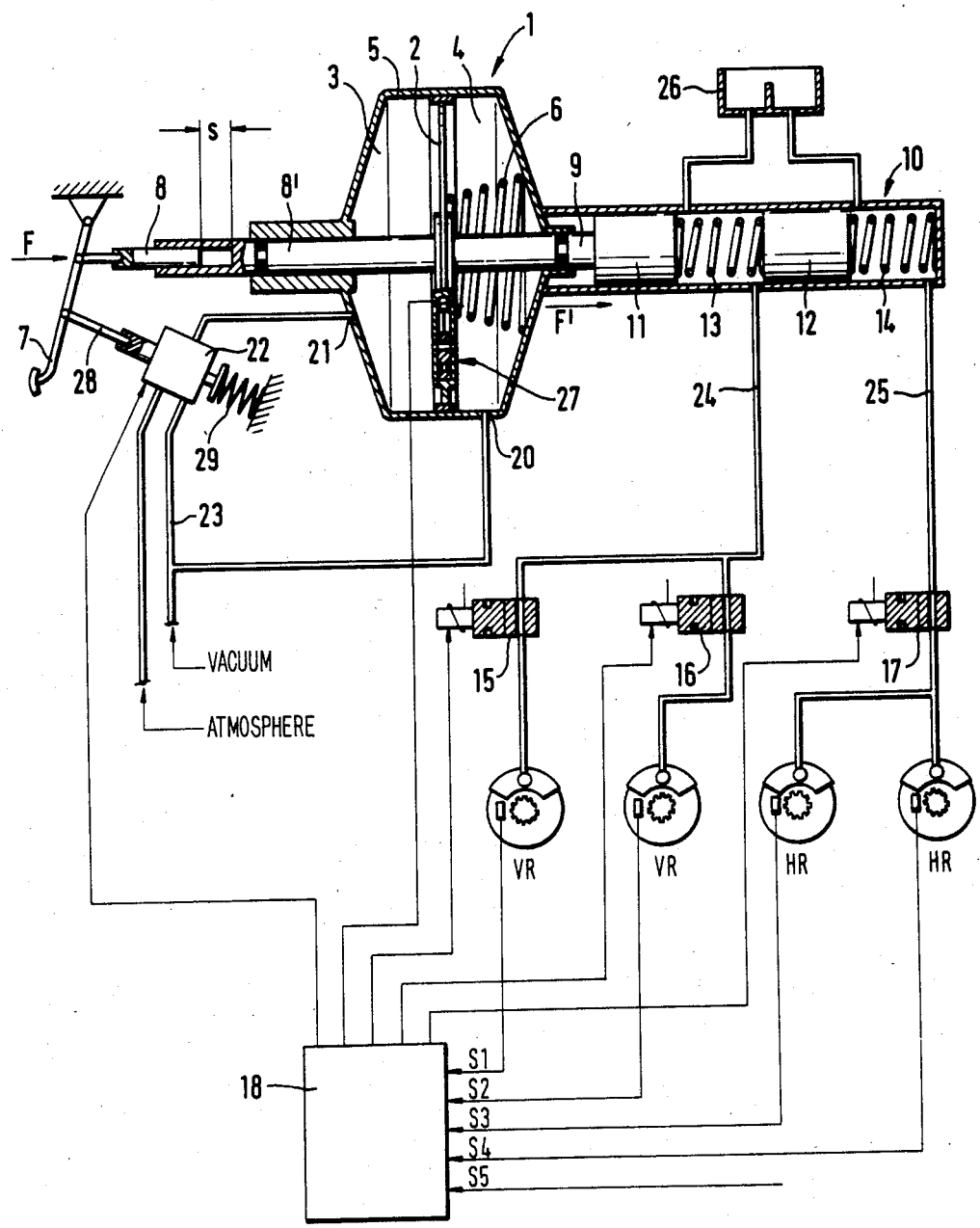
FIG. 1 shows a diagram of a slip-controlled brake system in which the servo unit is controlled by a valve with simulator device.

In the embodiment according to FIG. 1, the inventive brake system comprises a servo unit 1 which has a set-up following the principle of a conventional vacuum power booster and is furnished with a power piston 2 and with the two power chambers 3 and 4 being bounded by the housing or vacuum cylinder 5, on one side, and by the power piston 2, on the other side. The piston 2 is returned into the release position of the brake by the piston return spring 6. The brake pedal effort F is transmitted from the pedal 7 to the piston 2 through a two-part piston rod 8,8'. The external power or auxiliary power-boosted pedal effort F' is transmitted, with he aid of a push rod 9, from the piston 2 directly to the master cylinder, or rather, to the pistons 11 and 12 of a tandem master cylinder 10 in this instance. As customary, the two pistons 11, 12 are returned into their initial position by main springs 13, 14 upon the release of the brake.

The front wheels VR are linked to the tandem master cylinder 10 through one each 2/2-way valve 15, 16 and the rear wheels HR through the 2/2-way valve 17 in this case. With the aid of the valves 15, 16, the brake pressure is controllable at the front wheels individually and with the aid of the valve 17, controllable at the rear wheels only in common.

In the embodiment illustrated in FIG. 1, the behavior of rotation of all wheels is inquired through sensors, for example through inductive measured-value pick-up units. Relevant signals are transmitted to a central electronic unit 18 through signalling lines S1 and S4. Information regarding the vehicle speed or deceleration could be fed in through the sensor inlet S5, which is outlined in the drawing if this information would not be collected from the sensor signals S1 to S4.

In the central electronic unit 18, the sensor signals are logically linked, processed and control signals for the 2/2-way valves 15, 16, 17 and for a short-circuit valve 27 generated from them according to given criteria.

All valves are shown in FIG. 1 in their de-energized switching position in which they are before the start of the brake slip control action, that is to say, also during a non-controlled braking action. In the event of a failure or a cut-out of the electronics or of the current supply, a power-assisted braking does, therefore, remain possible, even though without brake slip control.

The servo unit 1 is initially operated like a conventional vacuum brake power booster, through the vacuum connection 20, the atmosphere connection 21 and the pedal-actuated atmosphere control valve 22 which doses the influx of air into the power chamber 3 depending on he pedal effort F. Prior to the operation of the brake, vacuum exists both in the left-side and in the right-side power chambers 3, 4 of the servo unit 1, entering the right-side power chamber 4 through the connection 20 and the left-side power chamber 2 through the atmosphere control valve 22. When the brake is operated, first of all the vacuum line 23 is separated from the atmosphere connection 21 by means of the atmosphere control valve 22, and thereupon atmospheric air is fed into the power chamber 3 in a dosed manner through the atmosphere control valve 22 and the connection 21, with the short-circuit valve 27 being in the closed position. The atmosphere control valve 22 is furnished with a valve member which is slidable against the force of a spring 29, the spring 29 simulating a force of reaction at the pedal 7 and so giving the driver of the vehicle a feeling for the brake power applied. The pressure difference between the chambers 3 and 4 results in an external or auxiliary power which boosts the pedal effort F and is transmitted, jointly with the pedal effort F, to the pistons 11, 12 in the master cylinder 10 in the direction of the arrow F', through the push rod 9, and finally, through the hydraulic brake circuits 24, 25, to the symbolically outlined wheel cylinders of the front and rear wheels.

A supply tank 26 supplying the master cylinder 10 with hydraulic fluid is also outlined in FIG. 1.

Now, if a locking tendency is sensed at one wheel, for example at the front wheel VR shown on the left, and a relevant signal is transmitted to the electronic unit 18 over the signalling line S1, the brake slip control action will start. For this purpose, the linkage of the connections 21 and 20 is briefly exchanged due to the energization of the valves 22 and 27, respectively and, as a consequence, the pressure conditions in the power chambers 3 and 4 changed and the power F' transmitted to the master cylinder 10 by the push rod 9 partly or even completely compensated in this manner. The pressure in the power chambers 3 and 4 will decrease. Since, however, the valves 16 and 17 leading to the wheels which do not at this point show any locking tendency were commutated at the same time, that is, for the duration of the phases of a pressure decrease, the pressure in the wheel cylinder of the front wheel linked to the valve 15 will follow the decrease of the pressure in the master cylinder.

On the end of the pressure decrease at the front wheel VR shown on the left, the pertaining valve 15 is energized and, thus, the pressure at this wheel kept constant on that low level and the brake pressure in the master cylinder 10 increased again due to the switching-back of the valve 27 into its initial position. The rise of the brake pressure in one or in both circuits can now be continued by unlocking or switching back one or both valves 16, and 17. In the same manner, that is, by locking the hydraulic circuits not involved and by briefly commutating the valve 27 in the vacuum and atmosphere supply lines, the brake pressure allows to be reduced at the second front wheel and at the rear axle, one after the other or in parallel, to the value calculated by the electronic unit 18, be maintained constant by an appropriate valve control action or be increased as the calculated value may be.

The piston rod 8 is configured two-part, as a result whereof the pedal 7 is uncoupled from the power piston 2 when the foot effort F is diminished. In this manner, the pistons 11, 12 of the master cylinder 10 are prevented from moving still after the closure of the solenoid valves 15 to 17, thereby reaspirating hydraulic fluid from the supply tank 26 through the primary cups.

In the event of equal pressure in both chambers 3, 4, the actuating power of the master cylinder 10 decreases to zero and, as a result, also the hydraulic pressure generated in the master cylinder 10. The atmosphere control valve 22 is equipped with a separate push rod 28 which is coupled to the brake pedal 7, a play s being provided in addition for the purpose of a mechanical unlocking between the atmosphere control valve 22 and the power piston 2, by means of which play s the free mobility of the power piston 2 relative to the pedal mechanism is safeguarded. In case of a failure of the external energy, a direct mechanical actuation of the master cylinder 10 is possible on overcoming the play s.

In FIG. 2, a servo unit 38 is shown in which the atmosphere control valve 39 is positioned within the housing of the servo unit 38, the spring 30 which simulates the force of reaction taking support directly at the piston rod 31. A rotary slide valve 36, too, which takes care of the pressure balance between the power chambers 34 and 35, is arranged in central position, the play s being provided between the piston rod 31 and the housing 37 of the valve 36. Contrary to that as per FIG. 1, the servo unit 38 is, furthermore, furnished with four power chambers 32, 33, 34, 35, with two pistons 40, 41 being provided, one of which acting directly on the piston 11 of the master cylinder 10 and the other piston being coupled to the housing of the atmosphere control valve 39. The size of the single-part piston 40 (reaction piston) acting on the housing of the atmosphere control valve 39 is selected such that the maximum possible pedal effort F allows to be held in equilibrium. The power chambers 32, 33, 34, 35 are connected to the atmosphere control valve 39 and to the vacuum source, respectively in such a manner that vacuum is applied to all four of the power chambers 32, 33, 34, 35 in the release position of the brake, whereas only the power chambers 32 and 35 are connected to the vacuum source and proportional pneumatic pressure exists in the power chambers 33 and 34 in the fully applied position instead. At the moment of a pressure decrease, exclusively the power chamber 32 is subjected to the vacuum, whereas the power chambers 34 and 35 are interconnected, through the rotary slide valve 36, in such a manner that an equilibrium of pressures may come about, a proportional pneumatic pressure existing in the power chamber 33 during this while. In order to improve the sensitivity with which pressure is controlledly dosed in, it will be of advantage to design the reaction area two-part, as is illustrated in more detail in FIG. 3. In this case, the piston 48 of the atmosphere control valve 42 takes support at the simulator spring 43. The simulator spring 43 is in abutment against the internal portion of the reaction piston 45. The reaction piston 45 is maintained in abutment against the housing of the servo unit 46 by the pressure differential between the atmospheric pressure controlledly dosed in and the vacuum. If the brake pedal is actuated with an effort above the point of control of the simulator spring 43, then the piston 44 will come in abutment against the piston 45 and will now be in equilibrium with the pressure differential x the total reaction area. In the event of a failure of the vacuum source, the piston 44 will come in abutment against the piston 45, so that both pistons 44, 45 will be shifted, against the weak spring 47, in the direction of the master cylinder. When the play s between the piston rod 48 and the stop 49 of the actuating piston 50 has been overcome, the piston 11 of the master cylinder 10 can be shifted directly. In case of an automatic anti-locking control, the rotary slide valve 55 positioned within the actuating piston 50 will be actuated in three steps, the power chambers 52 and 53 being linked and the chambers 53 and 54 being separated from each other in the first step. In the second step, the power chambers 52 and 53 and the power chambers 53 and 54 are separated from each other and in the third step, the power chambers 52 and 53 are separated from each other and the power chambers 53 and 54 are interconnected.

As an alternative to the rotary slide valve 55 arranged coaxially as shown in FIG. 3, a servo unit 56 with two 2/2-way flat slide valves is illustrated purely diagrammatically in FIG. 4. Four power chambers 66, 67, 68, 69 are provided also in this servo unit 56, the two power chambers 67 and 68 being divided from each other by a rigid partition wall 70. The connections which are not shown in detail correspond to those of the servo unit 38 according to FIG. 2. Also the operation phases of release position, applied position and pressure decrease exist when the identical pressure conditions prevail. In place of the two-valve control illustrated in FIG. 4, the servo unit 71 may alternatively be provided with one sole 2/2-way valve 72 in the power piston 73, as is shown diagrammatically in FIG. 5. It is, however, necessary to limit the volume of air entering the power chamber 75 by a suitably designed restrictor 77 in order to make sure that the air aspirated by the vehicle engine through the servo unit 71 does not influence the true running of the vehicle engine. The restrictor 77 may be designed such that its resistance is controlled depending on the volume passing through the restrictor 77. FIG. 6 shows a diaphragm-type by-pass valve 78 suitable for the purpose which may be arranged coaxially on the partition wall 82 (FIG. 5). As to its rigidity and dimensions, the diaphragm 79 is designed so as to close the passages 80 and 81 when high velocities of flow occur in the range of the power piston 73 and when the local static pressure decreases, so that the external pressure leads to the diaphragm 79 adhering to the partition wall 82. Upon the pressure balance between the power chambers 74 and 75, the passages 80, 81 will be completely opened again thanks to the intrinsic elasticity of the diaphragm 79.

FIG. 7 shows an atmospheric control valve 42 of the type suitable for utilization also with the servo unit 46 according to FIG. 3. The piston rod 84 contains a duct 85 running in central position and serving for the influx of atmospheric air which is allowed to flow into the annular chamber 91 and forth from there, through the radial duct 92, into the power chamber 93 after the valve piston 90 has lifted off from the poppet valve 86. When the valve piston 90 is moved in the direction indicated by the arrow F, the poppet valve 86 will lift off from the valve seat 89 and the power chamber 94 will be connected, through the inclined duct 95, to the annular chamber 91, so that a pressure balance can take place between the power chambers 93 and 94.

What is claimed is:

1. A slip-controlled brake system for automotive vehicles having wheels and wheel cylinders, said system being provided with a power assisted, brake pedal-actuated master cylinder (10), with sensors for the determination of the behavior of rotation of the wheels and of the vehicle speed, with valves (15, 16, 17) in the hydraulic fluid supply lines (24, 25) connecting the master cylinder (10) to the wheel cylinders and with an electronic switching arrangement (18) for the logical linkage and processing of the sensor signals (S1 to S4) and for the generation of valve control signals, with a power-assisted pedal force (F') directed on said master cylinder (10) being temporarily compensatable by an external power acting in opposite direction and with the wheel cylinders being connected, within the phase of reduced pressure in said master cylinder (10), to said master cylinder (10) through the said hydraulic fluid supply lines (24,25) or being cut off due to an actuation of the said valves (15, 16, 17) as a function of the instantaneous behavior of rotation of at least one wheel, with a servo unit (1, 38, 46, 56, 71) arranged in accordance with the principle of a vacuum brake power booster being provided for the generation of the auxiliary power and of the oppositely directed external power, said servo unit (1, 38, 46, 56, 71) comprising a vacuum cylinder with a power piston (2, 41, 50, 73, 98) which, in accordance with the pressure differential in the power chambers (3, 4; 34, 35; 68, 69; 75, 76; 53, 54) on either side of said power piston (2, 41, 50, 73), transmits a pressure to a push rod (9) which acts upon a master-cylinder piston (11, 12), the pressure differential in the two said power chambers being controllable with the aid of valves (22, 39, 42, 99, 100) as a function of the brake pedal effort (F), wherein a play (s) is provided between the piston rod (8, 31, 84) coupled to the brake pedal (7), on one side, and the push rod (9) of the said master cylinder (10), on the other side, and wherein said piston rod (8, 31, 84) shifts the said push rod (9) on having overcome said play (s) and with a piston (40, 41, 44) subjected to the atmospheric pressure arranged to act, in reaction to the foot effort (F), on the valve member (8', 31, 48, 84) of said servo unit (1, 38, 46, 56, 71) controlling the flow of atmospheric air and a valve (27, 36, 55, 72, 96) arranged in said power piston (2, 41, 50, 73) of said servo unit, a valve (27, 36, 55, 72, 96) effecting the pressure balance between said power chambers (3, 4; 34, 35; 53, 54; 68, 69; and 75, 76) on either side of said power piston (2, 41, 50, 73) to control the power (F') acting on said push rod (9).

2. A slip-controlled brake system as claimed in claim 1, wherein said valve arranged at the said power piston (41, 50) is provided as a rotary slide valve (36, 55) whose housing (37, 97) is coupled to said push rod (9) acting on the said piston (11) of said master cylinder (10).

3. A slip-controlled brake system as claimed in claim 1, wherein said valve provided at the said power piston (2, 98, 73) is provided as a flat slide valve (27, 96, 72), said power piston being directly coupled to said push rod (9) acting on the said master-cylinder piston (11) of said master cylinder (10).

4. A slip-controlled brake system as claimed in claim 3, wherein said valves (36, 55, 27, 96, 72) arranged at the said power piston (41, 50, 2, 73, 98) are provided as solenoid valves and are controlled from an central electronic unit (18) through signalling lines.

5. A slip-controlled brake system as claimed in claim 4, wherein the housing of an atmosphere control valve (39, 42, 99, 100) is subjected to the force exerted by said piston (40, 41, 44, 101, 102) which is slidably mounted within the housing of said servo unit (38, 46, 56, 71) and is subjected to the atmospheric pressure and/or to the vacuum.

6. A slip-controlled brake system as claimed in claim 5, wherein a compensating piston (45) is slidably arranged in said housing of said servo unit (46) and subjected to at least one of the atmospheric pressure and the vacuum and having a circular ring-shaped active area and a concentrically disposed annular portion (103) within which said auxiliary piston (44) is slidably supported relative to said compensating piston (45).

7. A slip-controlled brake system as claimed in claim 6, wherein said atmosphere control valve (42) is furnished with a poppet valve (86) with which said piston rod (84) interacts through a rubber-elastic reaction disc (83) and a valve piston (90) which are interposed, said poppet valve (86) being furnished with a head element (104) which, in the event of a failure of the vacuum, corresponds with a stop (49), on one side, being coupled to the said push rod (9), and which is in abutment against the front face of said valve piston (90), on the other side.

8. A slip-controlled brake system as claimed in claim 7, wherein in a release position of the brake, a poppet valve (86) shuts off passages (92, 95) for hydraulic fluid from a power chamber (93) before said auxiliary piston (44) to the power chamber (94) behind said auxiliary piston (44), a play (s) coming about between a valve piston (90) and said central head element (104) of said poppet valve (86).

9. A slip-controlled brake system as claimed in claim 8, wherein a partition wall (70, 82, 105, 106) is positioned between one of said auxiliary piston (40, 101, 102) and a compensating piston (45), on one side, and said power piston (41, 50, 98, 73), on the other side, in the housing of said servo unit, said partition wall (70, 82, 105, 106) dividing the power chamber for the said power piston (41, 50, 73, 98) from the power chamber for said auxiliary position (40, 45, 101, 102).

10. A slip-controlled brake system as claimed in claim 9, wherein a valve, for example, a diaphragm valve (78) or a throttle valve (77), is arranged in the said partition wall (70, 82).

* * * * *